United States Patent [19]
Carbonnel et al.

[11] 4,119,469
[45] Oct. 10, 1978

[54] INSULATING CERAMIC SUBSTANCES HAVING CONTROLLED POROSITY AND THE METHOD FOR PREPARING THEM BY SINTERING

[75] Inventors: Henri Carbonnel, Antony; Francois Chaminade, Etampes, both of France

[73] Assignee: Groupement pour les Activites Atomiques et Avancees, Le Plessis Robinson, France

[21] Appl. No.: 793,341

[22] Filed: May 3, 1977

Related U.S. Application Data

[63] Continuation of Ser. No. 692,075, Jun. 2, 1976, abandoned, Continuation of Ser. No. 471,746, May 20, 1974, abandoned.

[30] Foreign Application Priority Data

May 18, 1973 [FR] France .............................. 73.18172
Nov. 30, 1973 [FR] France .............................. 73 42882

[51] Int. Cl.$^2$ ............................................ C04B 21/00
[52] U.S. Cl. ................................... 106/40 R; 106/55; 106/57; 106/65; 106/73.2
[58] Field of Search ................. 106/57, 65, 73.1, 73.2, 106/73.3, 73.4, 40 R

[56] References Cited

U.S. PATENT DOCUMENTS

| 3,025,175 | 3/1962 | Alred .................................... 106/57 |
| 3,753,746 | 8/1973 | Koerner ............................... 106/65 |

*Primary Examiner*—James Poer
*Attorney, Agent, or Firm*—Sughrue, Rothwell, Mion, Zinn and Macpeak

[57] ABSTRACT

The present invention concerns insulating ceramic substances, passive with respect to corrosive molten metals such as aluminium or steel, having a controlled porosity, withstanding without cracking repeated thermal shocks. Such ceramics are obtained by sintering without charge at a low temperature after addition of a fluoride.

16 Claims, No Drawings

INSULATING CERAMIC SUBSTANCES HAVING CONTROLLED POROSITY AND THE METHOD FOR PREPARING THEM BY SINTERING

This is a continuation, of application Ser. No. 692,075 filed June 2, 1976 also in turn a continuation of Ser. No. 471,746, filed May 20, 1974, both now abandoned.

BACKGROUND OF THE INVENTION

1. Field of the Invention

The present invention concerns insulating ceramic substances having controlled porosity and the method for preparing them by sintering.

2. Description of the Prior Art

It is known that numerous modern techniques relating to the treatment of molten metals or to the circulating thereof require, on the part of the materials placed in contact with the liquid metals, properties which are fairly difficult to conciliate:

The material must be passive with respect to the molten metal which may be very corrosive when hot, as is the case with aluminium or steel;

The material must bear, without cracking, repeated thermal shocks which are very great, resulting from the sudden change of the ambient temperature to the temperature of the molten metal and vice versa;

The material must, moreover, have, when hot, well-defined properties with respect to electricity : remain insulant or conductive, according to the use which is made thereof; lastly, the material must remain stable in an oxydising atmosphere.

It is known that, since a very long time, it is a known method to mix fine powders of oxydes in group IV, sinter them under pressure at a high temperature with a view to obtaining a very dense product, crush these grains and sinter under charge the preceding product. A very compact product, cracking rapidly if it is subjected to these temperature cycles, is thus obtained.

It is also known that the fine powder mulled with an addition of a fluoride of an element in group IA has also been used and has also led to the manufacturing of a compact ceramic product. Indeed, the fluorine ion which is probably released tends to make the adhering of the grains together easier.

It will be seen therefore that these various known methods make it possible to obtain a compact ceramic substance whose properties cannot satisfy the requirements mentioned above.

SUMMARY OF THE INVENTION

To produce materials which satisfy the whole of the qualities required of the ceramic substances to be placed in contact with molten metals, the inventors have sought to produce ceramic substances having controlled porosity, that is, wherein during manufacturing, it is possible to impart to that ceramic substance the required porosity enabling it to withstand a thermal shock having a predetermined amplitude.

The method perfected and making it possible to obtain, by sintering, insulating ceramic substance having controlled porosity, passive with respect to corrosive molten metals such as aluminium or steel, comprises the following operations:

Mixing of fine powders of oxydes of elements chosen from groups III and IV of the periodic classification of elements;

Sintering under high pressure, at a high temperature, of a part of the mixture of fine powders of oxydes of elements chosen from groups III and IV with a view to obtaining a very dense product;

Crushing of the sintered product thus obtained;

Mixing of the crushed product with the remainder of the fine powder obtained during the first mixing operation;

Mulling of the mixture of the crushed product with the fine powder after addition of 0.1 % to 6 % of the total weight of a fluoride of an element of the group IA of the periodic classification of elements;

Proceeding with the vibrating in a mould of the preceding mulled product during a short period;

characterized in that the mixture obtained after vibrating is sintered without charge during one to several hours at a temperature comprised between 850° C and 1350° C in a controlled atmosphere.

It is evidently more easy to use the same mixture of fine powders of oxydes both for producing crushed grains and for constituting the fine powder to be mixed with the crushed grains. Nevertheless, a different chemical composition modifies very substantially the mechanical properties of the product obtained. The mechanical properties are improved by using oxydes of beryllium, of calcium, of zirconium, of hafnium, of lanthanum or of yttrium. The vibrating of the mixture of the mould does not always improve the product obtained and it should even be recommended not to proceed with that operation when using crushed grains having relatively large dimensions. In any case, vibrating must be a short operation.

It should be observed that the final sintering operation is effected at a relatively low temperature, the fluorine ion effecting, when hot, the grains and powders of oxydes. It is, in general, an advantage to effect that sintering in a neutral atmosphere, although with certain oxydes, it is preferable to operate in a reducing atmosphere. In certain cases, it is an advantage to use a hydrogen atmosphere.

DESCRIPTION OF THE PREFERRED EMBODIMENTS

The examples herebelow are given purely by way of illustration and have no limiting character.

A fine powder of zirconium oxyde (element of group IVB) stabilized with lime or with yttrium oxyde or cerium oxyde has been produced, the proportion of the stabilizing element being only 5 % of the total weight.

This powder, which passes through sieve 27 according to French standards (about 30 mesh US Standard), has been used as the raw material. 80 % of the powder has therefore been sintered under charge at a high temperature (1800° C) in order to obtain a very compact product with virtually no porosity. The product obtained has been crushed into grains having a diameter of a few millimeters.

To that compact crushed product has been added the remaining fine powder. That mixture has been mulled with 1 % of lithium fluoride, then it has been placed in a graphite mould and vibrated for a few minutes. The mould and its contents have then been brought, for 2 hours, to 1350° C in a reducing atmosphere. The final product obtained after cooling has a porosity in the order of 40 %, this improving considerably its resistance to thermal shocks.

Sintering without charge in a reducing atmosphere in contact with lithium fluoride has made it possible to maintain a temperature lower than 450° C in relation to the temperature of the sintering operation intended to obtain the compact product to be crushed and it was possible to avoid applying a charge to the product to be sintered.

That lowering of the sintering temperature is checked in all cases. In this way, a powder of oxydes which is sintered normally under charge at 1300° C may be sintered without charge at 850° C. By making the proportions of the mixture of crushed grains and of fine powder vary, it is thus possible to obtain insulating ceramic substances having various porosities better suited to the amplitude of the thermal shock which they shall have to undergo during their use. In any case, it has nevertheless been observed that it was an advantage to mix with the powder a percentage of grains greater than 30 % in relation to the total weight.

Lastly, it has been observed that the ceramic substances obtained by the method described above remain passive in contact with molten metals as corrosive as aluminium or steel and are not wetted by the molten metals. In this way, when they are withdrawn from the molten metal, there is no less nor undue flow of the said molten metal.

A second example shows the case where the grains and the fine powder are those of one and the same oxyde, but where the grains are relatively small and pass through sieve 22 according to French standards (or 100 mesh US standard), whereas the powder passes through sieve 17 (325 mesh US standard).

Lastly, it has been observed that in numerous cases, it is possible to operate in an atmosphere of air and that there is no need to use a controlled atmosphere. The following operations are effected:

A mixture of alumina formed by grains passing through sieve 22 (100 mesh US standard) and of powder passing through sieve 17 according to French standards (325 mesh US standard) has been mulled with 2 % of lithium fluoride;

The product obtained has been bound by means of the incorporation of an organic gel of the gum arabic type, available in trade. This organic product is used exclusively as a temporary rinsing agent and disappears when the product is fired;

The bound product has been inserted in a mould and put into shape by compacting;

Then the product, once formed has been brought in the open air to 1100° C during 6 hours.

The ceramic substance thus obtained is very stable and withstands thermal shocks and the corrosive action of molten aluminium very well or at least as well as products made by more complex manufacturing obtained by a complete method.

By making the diameter of the small grains and their percentage vary, it was possible to obtain a porosity of the ceramic substance comprised between 25 % and 50 %; it seems that the porosity of 40 % gives, in the majority of cases, the results providing the greatest advantages.

Although the methods which have just been described appear to afford the greatest advantages for implementing the invention, it will easily be understood that various modifications may be made thereto without going beyond the scope of the invention, it being possible to replace certain stages of the method by other similar operations liable to fulfill the same technical function or an equivalent technical function therein, it being possible, lastly, simply to dispense with certain stages of the method in certain particular cases.

What is claimed is:

1. A molded, insulating sintered ceramic resistant to repeated thermal shocks and passive with respect to corrosive molten metals such as aluminum or steel, said ceramic consisting essentially of fine powders of oxides of at least one element chosen from groups III and IV of the periodic classification of elements with in excess of 30% by weight of dense, sintered fine compact grains of the same oxides used as said fine powders, said ceramic having a porosity between 25 and 50%.

2. The ceramic substance of claim 1, wherein a metallic oxide of group IV of the periodic classification of elements is employed which has been stabilized by an oxide of a metal of group IIA of the periodic classification of elements.

3. The ceramic substance of claim 2, wherein said oxide of a metal of group IIA of the periodic classification of elements is lime.

4. The ceramic substance of claim 1, wherein a metallic oxide of group IV of the periodic classification of elements is employed which has been previously stabilized by an oxide of an element of group III of the periodic classification of elements.

5. The ceramic substance of claim 1, wherein zirconium and hafnium oxides are employed.

6. The ceramic substance of claim 1, wherein lanthanum and Yttrium oxides are employed.

7. The ceramic substance of claim 1, wherein the grains and powders are of the same oxides mixed in the same proportions.

8. The ceramic substance of claim 1, wherein said grains and said powders are of a single oxide.

9. The ceramic substance of claim 8, wherein the oxide used is an oxide of group III of the periodic classification of the elements, the grains used pass through a sieve 22 according to French standards and the powder used passes through a sieve 17 according to French standards.

10. The ceramic substance of claim 1, wherein alumina is used as an oxide.

11. The ceramic substance of claim 1, wherein the ceramic is sintered below 1350° C in the absence of pressure.

12. The ceramic substance of claim 1 wherein 0.1 to 6% of lithium fluoride is present during the sintering of the ceramic.

13. The ceramic substance of claim 1, wherein said sintering below 1350° C is carried out in a hydrogen atmosphere.

14. The ceramic substance of claim 1, wherein said sintering at a temperature of below 1350° C is carried out in a neutral atmosphere.

15. A molded, insulating sintered ceramic resistant to repeated thermal shocks and passive with respect to corrosive molten metals such as aluminum or steel, said ceramic consisting essentially of fine powders of oxides of at least one element chosen from groups III and IV of the periodic classification of elements with in excess of 30% by weight of dense, sintered fine compact grains of the same oxides used as said fine powders, said ceramic having a porosity between 25 and 50%, said ceramic having been sintered below 1350° C in the absence of pressure, below 1350° C in a hydrogen atmosphere or below 1350° C in a neutral atmosphere.

16. The ceramic substance of claim 1 consisting of said fine powders and said sintered fine compact grains.

* * * * *